(12) United States Patent
Urdiales Delgado et al.

(10) Patent No.: US 9,898,536 B2
(45) Date of Patent: Feb. 20, 2018

(54) SYSTEM AND METHOD TO PERFORM TEXTUAL QUERIES ON VOICE COMMUNICATIONS

(71) Applicants: JAJAH LTD., Ra'Anana (IL); Telefonica, S.A., Madrid (ES)

(72) Inventors: Diego Urdiales Delgado, Madrid (ES); John Eugene Neystadt, Madrid (ES)

(73) Assignees: JAJAH LTD., Ra'Anna (IL); Telefonica, S.A., Madrid (ES)

(*) Notice: Subject to any disclaimer, the term of this patent is extended or adjusted under 35 U.S.C. 154(b) by 530 days.

(21) Appl. No.: 14/411,152

(22) PCT Filed: Jun. 27, 2013

(86) PCT No.: PCT/EP2013/063507
§ 371 (c)(1),
(2) Date: Dec. 24, 2014

(87) PCT Pub. No.: WO2014/001449
PCT Pub. Date: Jan. 3, 2014

(65) Prior Publication Data
US 2015/0339390 A1 Nov. 26, 2015

(30) Foreign Application Priority Data
Jun. 28, 2012 (EP) .................................. 12382256

(51) Int. Cl.
*G10L 15/00* (2013.01)
*G06F 17/30* (2006.01)
(Continued)

(52) U.S. Cl.
CPC .... *G06F 17/30867* (2013.01); *G06F 17/3053* (2013.01); *G06F 17/30312* (2013.01);
(Continued)

(58) Field of Classification Search
CPC .. G06F 17/30778; G10L 15/26; G10L 15/265
See application file for complete search history.

(56) References Cited

U.S. PATENT DOCUMENTS 6,636,238 B1 10/2003 Amir et al.
6,697,796 B2 2/2004 Kermani
(Continued)

OTHER PUBLICATIONS

International Search Report for PCT/EP2013/063507 dated Sep. 13, 2013.

*Primary Examiner* — Daniel Abebe
(74) *Attorney, Agent, or Firm* — Sughrue Mion, PLLC

(57) ABSTRACT

Methods and systems to perform textual queries on voice communications. The system has an index service for storing a audio content data sets for voice communications. The audio content data sets include at least three audio content data sets for each voice communication. The three audio content data sets include a first audio content data set generated using a speech-to-text conversion technique, a second audio content data set generated using a phoneme lattice technique, and a third audio content data set generated using a keyword identification technique. The system includes a search engine configured to: receive search criteria from a user, the search criteria having at least one keyword; search each of the first, second and third audio content data sets for at least a portion of the plurality of voice communications to identify voice communications matching the search criteria; and combine the voice communications identified by each search to produce a combined list of identified voice communications.

16 Claims, 5 Drawing Sheets

(51) Int. Cl.
*G10L 15/08* (2006.01)
*G10L 15/26* (2006.01)
*G10L 25/54* (2013.01)
G10L 15/32 (2013.01)
G10L 15/02 (2006.01)

(52) U.S. Cl.
CPC ........ *G06F 17/30746* (2013.01); *G10L 15/08* (2013.01); *G10L 15/26* (2013.01); *G10L 25/54* (2013.01); *G10L 15/32* (2013.01); *G10L 2015/025* (2013.01); *G10L 2015/088* (2013.01)

(56) References Cited

U.S. PATENT DOCUMENTS

| | | | |
|---|---|---|---|
| 2003/0177108 A1* | 9/2003 | Charlesworth | G06F 17/30681 |
| 2005/0010412 A1* | 1/2005 | Aronowitz | G10L 15/02 |
| | | | 704/254 |
| 2009/0055185 A1* | 2/2009 | Nakade | G10L 15/30 |
| | | | 704/257 |
| 2010/0179811 A1* | 7/2010 | Gupta | G10L 15/22 |
| | | | 704/235 |
| 2012/0029918 A1 | 2/2012 | Bachtiger | |
| 2016/0004773 A1* | 1/2016 | Jannink | G06F 17/30778 |
| | | | 707/741 |

\* cited by examiner

SYSTEM AND METHOD TO PERFORM TEXTUAL QUERIES ON VOICE COMMUNICATIONS

CROSS REFERENCE TO RELATED APPLICATIONS

This application is a National Stage of International Application No. PCT/EP2013/063507 filed Jun. 27, 2013, claiming priority based on European Patent Application No. 12382256.1 filed Jun. 28, 2012, the contents of all of which are incorporated herein by reference in their entirety.

TECHNICAL FIELD

The present invention relates to systems and methods for performing textual queries on voice communications.

BACKGROUND

Many communication systems provide users with the ability to perform text searches on archived textual communications, such as email and text messages. Typically the user provides a search engine with one or more search terms and the search engine returns a list of textual communications (i.e. email and text messages) that contain the search term(s). The user can then perform any standard action on the listed textual communications such as read/view the communication, forward the communication, and copy the text of the communication.

There has long been a need to provide users with the ability to perform similar text searches on archived voice communications, such as voice calls and voice mails.

A related patent in the field is patent application US-A1-20120029918 disclosing a system for recording, searching for, and sharing media files among a plurality of users. In said patent application the system include a server that is configured to receive, index, and store a plurality of media files, which are received by the server from a plurality of sources, within at least one database in communication with the server. In addition, the server is configured to make one or more of the media files accessible to one or more persons—other than the original sources of such media files and to transcribe the media files into text; receive and publish comments associated with the media files within a graphical user interface of a website; and allow users to query and playback excerpted portions of such media files. In said patent application, on contrary to the present invention, a weighted sum of a match score for each voice communication located by the search is not calculated. In the present invention the weighting can be based on the particular audio content data set used to identify the voice communication.

There is therefore a requirement for a system to address the shortcomings of current systems.

The embodiments described below are not limited to implementations which solve any or all of the disadvantages of known methods and systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first aspect, there is provided a system to perform textual queries on voice communications, the system comprising an index service for storing a plurality of audio content data sets for a plurality of voice communications, the plurality of audio content data sets comprising at least two audio content data sets for each voice communication, the at least two audio content data sets being selected from a text-to-speech audio content data set generated using a text-to-speech conversion technique, a phoneme audio content data set generated using a phoneme lattice technique, and a keyword audio content data set generated using a keyword identification technique; and a search engine configured to: receive search criteria from a user, the search criteria comprising at least one keyword; search each of the at least two audio content data sets for at least a portion of the plurality of voice communications to identify voice communications matching the search criteria; and combine the voice communications identified by each search to produce a combined list of identified voice communications.

In a second aspect, there is provided a computer-implemented method to perform textual queries on voice communications, the method comprising: storing a plurality of audio content data sets using an index service for a plurality of voice communications, the plurality of audio content data sets comprising at least two audio content data sets for each voice communication, the at least two audio content data sets being selected from a text-to-speech audio content data set generated using a text-to-speech conversion technique, a phoneme audio content data set generated using a phoneme lattice technique, and a keyword audio content data set generated using a keyword identification technique; and receiving at a search service search criteria from a user, the search criteria comprising at least one keyword; searching using the search service each of the at least two audio content data sets for at least a portion of voice communications to identify voice communications matching the search criteria; and combining the voice communications identified by each search to produce a combined list of identified voice communications.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
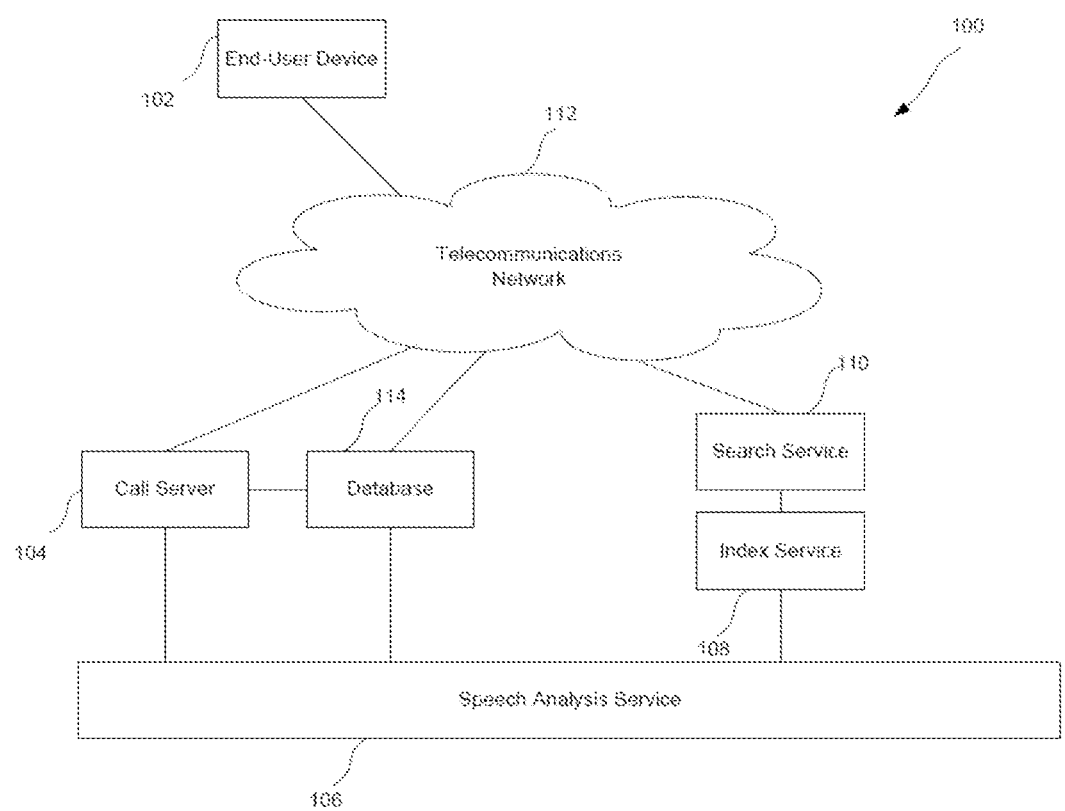
FIG. 1 is a schematic block diagram of a system for performing textual queries on voice communications.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a block diagram of a system 100 for text searching voice communications. The system 100 includes an end-user device 102 for making or receiving a voice communication, a voice communication server 104 for receiving data representing speech related to the voice communication, a speech analysis service 106 for analyzing the data to generate a plurality of audio content data sets for the voice communication, an index service 108 for indexing the plurality of audio content data sets, and a search service 110 for receiving one or more search terms from the end-user device 102 and searching the indexed audio content data sets to locate one or more voice communications containing the search term(s). The voice communications located by the search service 110 may then be provided to the end-user device 102 where they are displayed to the user. In certain embodiments different end-user devices may be utilized for making the communications and subsequently searching the communications.

The end-user device 102 allows the user to make or receive voice communications over a telecommunications network 112. The term "voice communication" is used herein to indicate any communication using speech and is intended to include, but is not limited to, telephone calls, teleconference calls, messages with voice attachment, video calls and voicemails. As will be apparent, where the techniques described herein are applied to video calls they are applied to the audio part of the communications.

The end-user device 102 may be a smart phone or may be a computer system configured to provide telephony functions to a user (for example a 'softphone' provided by an application running on a personal computer (PC) or portable computing device, or via a Web Browser on such device). The telephony functions are typically provided by communications applications running on the end-user device 102 which may be either installed applications from third parties or native applications provided as part of the device's operating system. For example, the end-user device 102 may be provided with a voice-over-IP (VoIP) client to conduct VoIP calls. As will be appreciated various combinations of telephony types may be utilized as is known in the art (for example, conventional telephony to VoIP calls).

The telecommunications network 112 may be any network, or combination of networks, capable of establishing a voice communication between end users. For example, the telecommunications network 112 may be a public switched telephone network (PSTN), a mobile telephone network, a data network (such as the Internet), a VoIP network or any combination thereof.

When a voice communication is made to or from an end-user device 102 subscribing to the relevant service, voice communication server 104 receives data representative of the speech of the voice communication from the telecommunications network 112. Once the voice communication server 104 has received the data it forwards the data to the speech analysis service 106 for analysis. This can happen after or during the course of the voice communication.

The voice communication server 104 typically receives audio signals for the voice communication from the telecommunications network 112. In some cases, the voice communication server 104 forwards the audio signals to the speech analysis service 106 so that the speech analysis service 106 can perform the analysis in real time. In other cases, the voice communication server 104 records the received audio signals as audio data files and forwards the audio data files to the speech analysis service 106. The voice communication server 104 may be configured to obtain the permission of the user and any other party to the voice communication prior to recording the received audio signals. To enable independent analysis of the parties each side of a voice communication may be recorded separately.

A copy of the recorded data may also be archived in a storage device, such as database 114, for future reference. Where this is the case, data is also stored in the database 114 to identify the voice communication and link it to the appropriate user. Further information on the voice communication, for example timing and participants, may also be stored in the database 114.

Depending on the users settings, data related to all or only a subset of the user's voice communications may be forwarded to the speech analysis engine 106. For example, the user may configure the system 100 to analyze only outgoing voice communications, only incoming voice communications, or only voice communications to and/or from a specific user or set of users. Furthermore, the system 100 may be configured to only analyze one side of a voice communication.

Speech analysis service 106 receives the speech data generated by the voice communication server 104 and analyzes the data to generate a plurality of audio content data sets for the voice communication. The term "audio content data set" is used herein to indicate any data that represents the content of a voice communication and is intended to include, but is not limited to, a textual transcript, a phoneme lattice, a word lattice, and a list of keywords. The term "audio content data set" is not intended to include data representing the audio waveform.

Preferably the speech analysis service 106 comprises a plurality of speech analysis engines and each speech analysis engine uses a different technique to analyze the data to generate an audio content data set. For example, the speech analysis service 106 may comprise a first speech analysis engine configured to use a first technique to generate a first audio content data set, a second speech analysis engine configured to use a second technique to generate a second audio content data set and a third speech analysis engine configured to use a third technique to generate a third audio content data set.

The first speech analysis engine may generate the first audio content data set using a text-to-speech conversion technique such that the first audio content data set is a textual transcript representing the best match text, possibly complemented by additional next-best matches. The second speech analysis engine 204 may generate the second audio content data set using a phoneme lattice technique such that the second audio content data set is a phoneme lattice. The third speech analysis engine 206 may generate a third audio content data set using a keyword identification technique such that the third audio content data set is a textual transcript of type-annotated keywords (that is, keywords and a category) in the voice communication. Each of these techniques will be described in reference to FIG. 2. An exemplary speech analysis service 106 will also be described in reference to FIG. 2.

Once the speech analysis service 106 has generated the plurality of audio content data sets, the audio content data sets are provided to the index service 108 for indexing. The speech analysis service 106 may also archive the audio content data sets in a storage device, such as database 114, so they can be viewed and/or analyzed at a later date.

The index service 108 receives the audio content data sets generated by the speech analysis service 106 and indexes each audio content data set to enable fast lookup. The audio content data sets may be indexed using any known indexing technique such as RDBMS (relational database management system). The index service 108 then stores the audio content data sets and associated indexes in its memory. The index service 108 may also archive the indexed audio content data sets in a storage device, such as database 114, so they can be viewed and/or analyzed at a later date.

The search service 110 is in communication with index service 108 and the end-user device 102 to allow a user to perform text searches on archived voice communications. For example, an application or web browser on the end-user device 102 may allow the user to specify search criteria which are transmitted to the search service 110. The search service 110 then searches each indexed audio content data set generated by the index service 108 to locate voice communications matching the search criteria.

Typically the search criteria comprise one or more keywords and the search service 110 searches the indexed audio content data sets to locate voice communications that contain the specified keyword(s). Together with, or instead of, the keywords, the search criteria may include restrictions on the type of the keywords that are searched for. For example, one criterion may be to search for person names only. Another example set of criteria may be: ("John", person names only).

Where the audio content data set is a phoneme lattice generated by a phoneme lattice technique, searching the indexed phoneme lattice may comprise first converting the specified keywords into phoneme representations and then using the phoneme representations of the keywords to search the indexed phoneme lattice. The phoneme representation may be further converted into a phoneme lattice prior to searching.

Information identifying the voice communications located by the search service 110 is then provided to the end-user device 102. Information identifying the voice communications may include, but is not limited to, the date of the voice communication, the telephone number or ID (e.g. Skype™ ID) of the other party, the name of the other party, the type of voice communication (e.g. telephone call, video call, teleconference call, voicemail). The search service 110 may also provide the end-user device 102 with information identifying the recorded voice communication associated with each located voice communication so that the user can retrieve, stream and/or play the recorded voice communication.

In some cases, the matched voice communications are sorted or ranked prior to providing them to the end-user device 102. For example, for each matched voice communication, a match score may be assigned. Any known method for generating a match score for search results may be used by the search service 110. For example, the match score may be based on how many times the keywords are found in the indexed-audio content data set.

A weighted sum of the match scores for each voice communication located by the search may then be calculated. The weighting may be based on the particular audio content data set that was used to identify the voice communication. For example, the search service 110 may locate a particular voice communication twice—once using the text-to-speech audio content data set (e.g. textual transcript) and once using the phoneme lattice audio content data set (e.g. phoneme lattice). The voice communication would then be assigned two match scores, one based on the text-to-speech audio content data set (e.g. textual transcript) and one based on the phoneme lattice audio content data set (e.g. phoneme lattice). A weighted sum is then generated for the voice communication by weighting the two match scores based on the particular audio content data set. For example, the weight assigned to a match score for a particular audio content data set may be based on the accuracy of the audio content data set. For example, the keyword technique may be the most accurate and given the highest weighting, and text-to-speech may be the least accurate and given the lowest weighting. The weighting may be adjusted for different sound environments, locations, background noise, and languages.

The search results may then be sorted based on the weighted sum. For example, the search results may be sorted in ascending or descending order based on the weighted sums.

The end-user device 102 receives the information identifying the located voice communications from the search service 110 and outputs the identifying information to the user. For example, the identifying information may be displayed in a search user interface on a display device of the end-user device 102. As described above, the identifying information may include, but is not limited to, the date of the voice communication, the telephone number or ID (e.g. Skype ID) of the other party, the name of the other party, the type of voice communication (e.g. telephone call, video call, teleconference call, and voice mail). Additionally, the identifying information may include cues as to why the located voice communication has been returned in the search results; for example, which of the input keywords were found in the voice communication and which types, if any, were associated with those keywords. The search user interface may enable to the user to perform one or more actions on the located voice communications. For example, the search user interface may enable the user to sort the located voice communications. The search user interface may also allow the user to retrieve, stream and/or play the located voice communications. An exemplary search user interface for an end-user device 102 is described in reference to FIG. 3.

In addition it is possible to adjust the weighting based on feedback from the user, based on their actions, by collecting an explicit signal (e.g. letting users vote for accurate/non accurate matches) or implicit ones, by observing, which of the multiple matches, a user chooses to act on.

The term "service" is used to indicate a program or system which provides certain functions. For example, an index service may provide the function of indexing data. The service may take the form of a program running on a single computer system, or may be provided by a plurality of computing system configured to work together to provide the functions. The functions may be accessed and utilized via a network system, for example the Internet. Any service may be implemented in any way known to the person of skill in the art. Although the various services have been described separately, one or more of the services may be provided as part of a single service, or by a single program of a computer system.

Where the term "connected" has been utilized in this document, it is not intended to require a permanent, always-on, connection. Rather it is used in the sense that the connected entities are connected, when required, to exchange data. For example, two entities would be connected by the transmission of data from one entity to another through an IP network.

Figure 2:
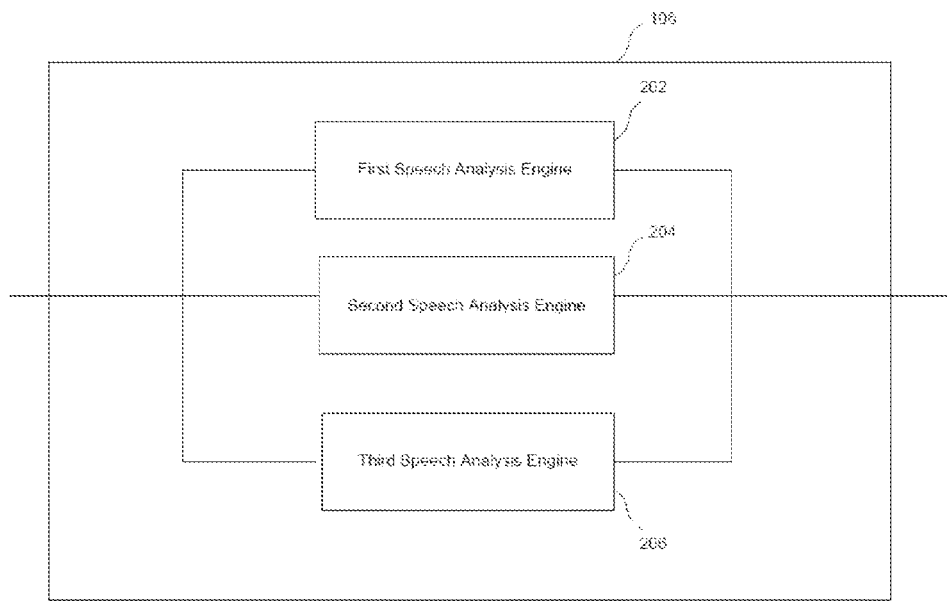
FIG. 2 is a schematic block diagram of the speech analysis service of FIG. 1.

Reference is now made to FIG. 2 which illustrates a block diagram of an exemplary speech analysis service 106 for analyzing the speech data to generate a plurality of audio content data sets. As described above, each audio content data set represents the content of the associated voice communication. The speech analysis service 106 of FIG. 2 comprises three speech analysis engines 202, 204, and 206 for generating the three audio content data sets. Each speech analysis engine 202, 204 and 206 uses a different technique for generating an audio content data set.

The first speech analysis engine 202 uses a speech to text conversion technique to generate a first audio content data set. In speech to text conversion techniques an automatic speech recognition (ASR) system is used to generate a textual transcript of the voice communication. The textual transcript typically comprises the best text matches. It may also include next best matches for specific phrases. Therefore in the speech analysis service 106 of FIG. 3 the first audio content data set is textual. A textual search can then be performed on the transcript.

The speech to text conversion technique faces two main problems. Firstly, ASR systems typically produce transcripts with a certain percentage of erroneously transcribed words. These errors may by due to a speakers pronunciation, voice fluctuation, articulation or accent. The errors may also be due to external factors such as background noise. The more challenging the acoustic conditions are, the higher the error rate will be.

Secondly, ASR systems typically use a finite dictionary of words to generate the transcript which limits the words that can be transcribed. For example, an ASR dictionary may not include proper names, uncommon words, and industry specific terms. Accordingly, speech to text conversion systems cannot adequately deal with words that are not in the dictionary. These words are referred to as out of vocabulary (OOV) words. The effects of this second problem are discussed in P. C. Woodland, S. E. Johnson, P. Jourlin and K. Sparck Jones, "Effects of out of Vocabulary Words in Spoken Document Retrieval", in Proc. SIGIR 2000.

The second speech analysis engine 204 uses a phoneme lattice technique to generate a second audio content data set. In a phoneme lattice technique a phoneme lattice is generated for the voice communication. Each node of the lattice is associated with a point in time through the audio, and each edge is assigned a phoneme hypothesis and a score representing the likelihood of that hypothesis. In this way the lattice can be used for the storage of multiple potential model sequences. Therefore in the speech analysis service 106 of FIG. 3 the second audio content data set is a phoneme lattice. Once the lattice has been generated, keyword searching is performed by matching the keyword pronunciation against the lattice.

An exemplary phoneme lattice technique is described in D. A. James, S. J. Young, "A fast lattice-based approach to vocabulary independent wordspotting," icassp, vol. 1, pp. 377-380, Acoustics, Speech, and Signal Processing, 1994. ICASSP-94 Vol 1, 1994 IEEE International Conference on, 1994. In James et al. the phoneme lattice is generated from a modified Viterbi speech recognizer based on the Token Passing Paradigm.

The phoneme matching technique provides several advantages over the speech-to-text conversion technique including its ability to locate words that are not in the ASR dictionary (the OOV words) and its ability to find partial matches between the search keyword(s) and the voice communication. However phoneme matching typically suffers from speed issues.

The third speech analysis engine 206 uses a keyword identification technique to generate a third audio content data set. In a keyword identification technique relevant words and/or phrases are identified in the speech and then transcribing the identified words and phrases into text. The relevant words may be generated from a static keyword list, a dynamic keyword list, a list of patterns such as dates, times or regular expression, or any combination thereof.

Figure 3:
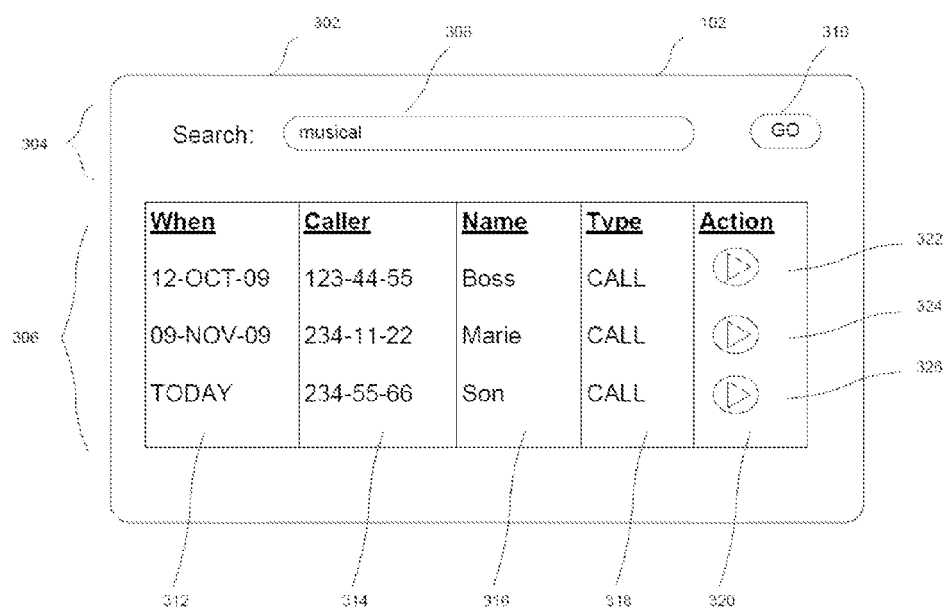
FIG. 3 is a schematic of a search user interface for the end-user device of FIG. 1.

Therefore in the speech analysis service 106 of FIG. 3 the third audio content data set is a set of transcribed keywords, and possibly a category tag assigned to each of the transcribed keywords.

Exemplary methods for identifying keywords in a speech document are described in Spanish Patent Application No. P201130858 and International Patent Application No. PCT/EP2012/059832 herein incorporated by reference.

While each technique provides certain advantages, there are situations where each technique alone would not produce accurate and reliable results. By combining the results of these three techniques more accurate and reliable results may be produced.

In other embodiments the speech analysis service may comprise additional speech analysis engines to generate additional audio content data sets using different techniques. For example, the speech analysis service may comprise a fourth speech analysis engine that generates a fourth audio content data set using a word matching technique. The word matching technique is similar to the phoneme matching technique in that a lattice is generated to represent the content of the voice communication. However, instead of generating a phoneme lattice, a word lattice is generated. The word lattice represents all possible word sequences that can be obtained from the voice communication.

Word matching systems provide an advantage over text to speech conversion systems in that they provide a plurality of inter-related possible word matches instead of just the best match or matches. Word matching systems can typically outperform lattice matching systems in terms of speed, but since word matching systems are based on a fixed dictionary, they cannot adequately deal with OOV words.

Reference is now made to FIG. 3 which illustrates a search user interface 302 for an end-user device 102. The search user interface 302 is divided into two sections—a search section 304 and a search results section 306. The search section 304 allows a user to initiate a search of archived voice communications related to that user. For example, in FIG. 3, the search section 304 comprises a search criteria input field 308 and a search activation button 310. The search criteria input field 308 allows a user to input criteria for a search. Typically the search criteria comprise one or more keywords. For example, in FIG. 3, the user has entered the search keyword "musical". The search activation button 310 allows the user to initiate or activate the search using the specified criteria. For example, in FIG. 3, pressing the "Go" button 310 initiates a search for voice communications containing the word "musical". The user could perform a new search by entering new keywords in the search criteria input field 308 and then pressing the search activation button 310. It will be evident to a person of skill in the art that the search section 304 may have other components and configurations, for example those needed to input criteria to filter keywords by type, or voice communications by caller.

The search results section 306 displays the results of the search. For example, in FIG. 3, the search results section 306 has four information columns 312, 314, 316, and 318 which display information about the search results. Specifically, the first column 312 displays information about when the voice communication was made. This may include such information as the date and time. The second column 314 displays information about the number or ID of the other party. For example, where the voice communication is a telephone call the second column 314 may display the telephone number of the other party. Where, however, the voice communication is a Skype™ call, the second column 314 may display the Skype™ user ID of the other party. The third column 316 identifies the other party using for example a name (i.e. "Marie") or a label (i.e. "Son" or "Boss""). This information may be obtained from the user's contact list, for example. The fourth column 318 displays information about the type of voice communication (e.g. telephone call, video call, teleconference call or voicemail). It will be evident to a person of skill in the art that the information about the search results may be displayed in any suitable manner and that the search results section 306 of FIG. 3 is merely an example of a suitable way of displaying the information. It will also be evident that other information about the voice communications, such as the length of the voice communication, may be displayed in addition to or instead of the information displayed in the four information columns 312, 314, 316 and 318 of FIG. 3.

The search results section 306 may also be configured to allow the user to perform one or more actions on the search results. For example, in FIG. 3, the search results section 306 has an action column 320 which allows a user to play the voice communications. Specifically, a play button is provided for each voice communication. In some cases, after a user has pressed the play button for a particular voice communication, the end-user device 102 sends a request to the database 114 for the recorded audio for the selected voice communication. In response, the database 114 provides a copy of the recorded audio for the voice communication to the end-user device 102. The recorded audio may be provided to the end-user device 102, for example, as an audio stream or a complete audio file. It will be evident to a person of skill in the art that the search results section 306 may allow the user to perform other actions, such as forwarding the voice communication, in addition to or instead of allowing the user to play the voice communication.

In FIG. 3, the search for voice communications containing the word "musical" has returned three results. The first search result 322 is a call that was made 12 Oct. 2009, to/from the users boss (123-44-55). The second search result 324 is call that was made on 9 Nov. 2009, to/from Marie (234-11-22). The third search result 326 is a call that was made today to/from the user's son (234-55-66). The second search result 324 may, for example, contain the following audio:

"I am going to London, what was the name of that musical that Marie loved there?"

"I really loved the Bob Foss's musical Chicago, you have to see it! You can get cheap tickets at Leicester Square".

Where the search results are sorted by the search service 110 before they are provided to the end-user device 102, the search results section 306 may display the search results in sorted or ranked order. For example, the first search result 322 may have the highest ranking and the third search results 326 may have the lowest ranking.

Figure 4:
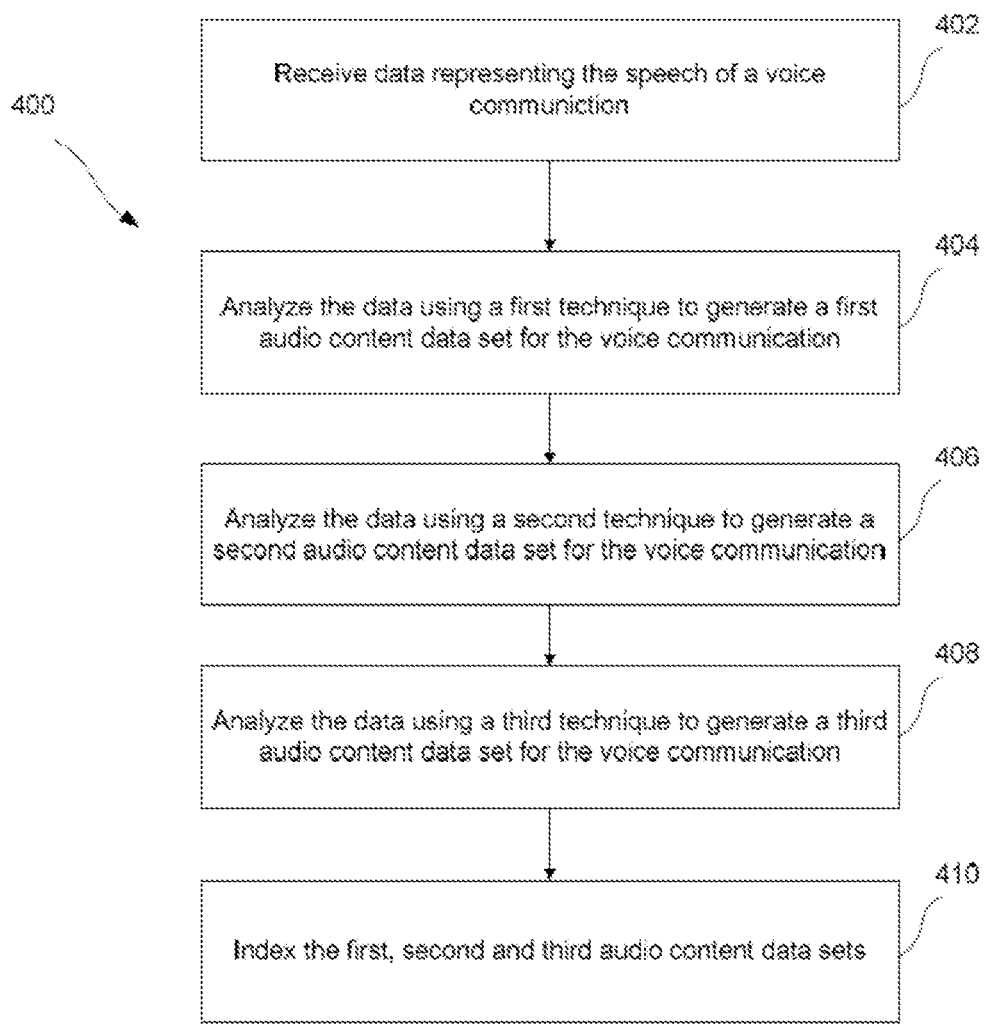
FIG. 4 is a method for generating indexed audio content data sets using the system of FIG. 1.

Reference is now made to FIG. 4 which illustrates a method 400 for generating a plurality of indexed audio content data sets for a voice communication using the system of FIG. 1. At step 402, the speech analysis service 106 receives data representing the speech of a voice communication. As described above, the voice communication may, for example, be a telephone call, a teleconference call, a voicemail, or a video call. The data may be a recording of the voice communication or a live audio feed.

At step 404 a first speech analysis engine 202 analyzes the data to generate a first audio content data set representing the content of the voice communication. As described above, the first speech analysis engine may generate the first audio content data set using a text-to-speech conversion technique such that the first audio content data set is a textual transcript representing the best match text.

At step 406, a second speech analysis engine 204 analyzes the data to generate a second audio content data set representing the content of the voice communication. As described above, the second speech analysis engine 204 may generate the second audio content data set using a phoneme lattice technique such that the second audio content data set is a phoneme lattice.

At step 408, a third speech analysis engine 206 analyzes the data to generate a third audio content data set representing the content of the voice communication. As described above, the third speech analysis engine 206 may generate a third audio content data set using a keyword identification technique such that the third audio content data set is a textual transcript of keywords in the voice communication.

It will be evident to a person of skill in the art that steps 404 to 408 of method 400 may be performed in any order or concurrently.

At step 410, the index service 108 indexes and stores each of the audio content data sets for efficient retrieval. As described above, the audio content data sets may be indexed using any known technique such as RDBMS.

Figure 5:
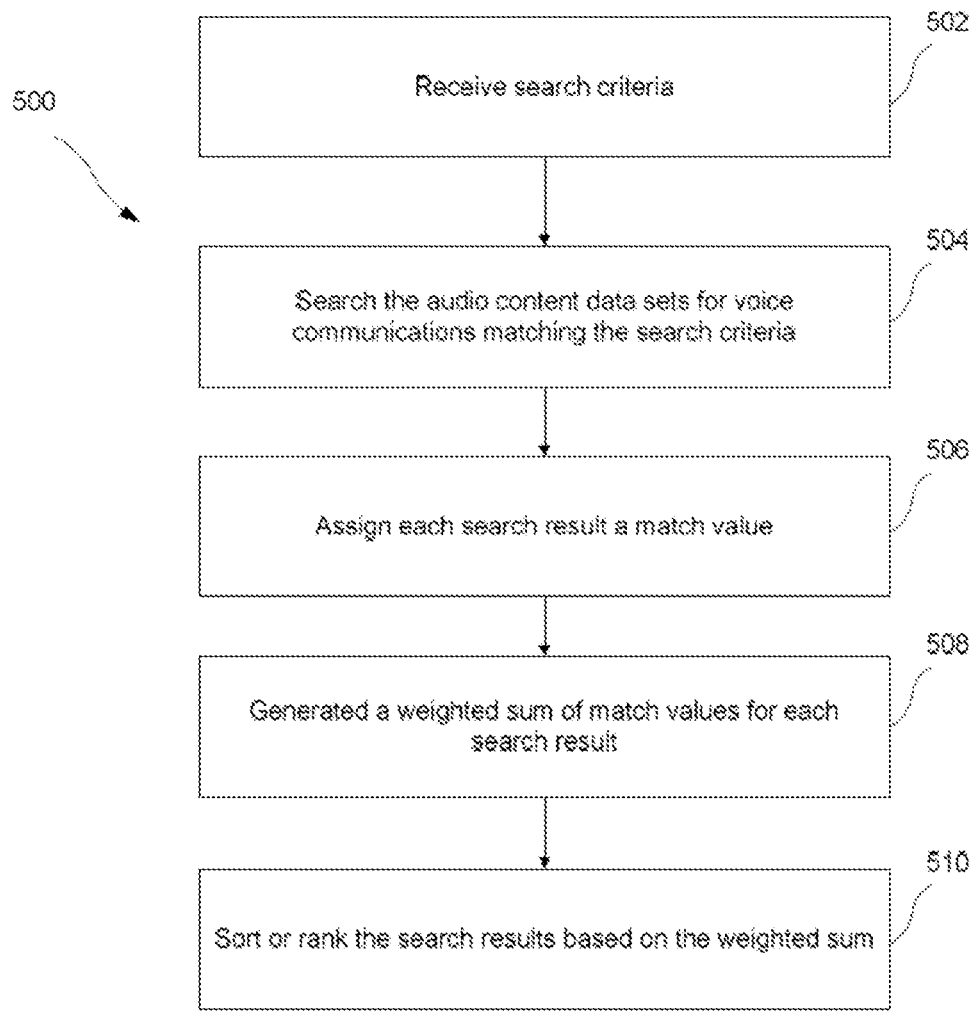
FIG. 5 is a method for text searching voice communications using the system of FIG. 1.

Reference is now made to FIG. 5 which illustrates a method 500 for performing textual queries on voice communications using the system of FIG. 1. At step 502 the search service 110 receives the search criteria from the user. The search criteria may be provided to the search service 110 from an end-user device 102 via a search user interface, such as search user interface 302. As described above, the search criteria typically comprises one or more keywords. The search criteria may also comprise information identifying the user so that only the user's voice communications are searched. The search criteria may also comprise other information which is used to further limit the search, such as dates, times, number/ID and/or party name.

At step 504, the search service 110 searches each of the indexed audio content data sets produced by the index service 108 to find voice communications matching the search criteria. Searching the indexed audio content data sets may comprise translating the search keywords into phonetic representations and using the phonetic representations to search the indexes. In some cases the phonetic representations may be further translated into a phoneme lattice prior to searching. As noted above, the search criteria may comprise information identifying the user. This information may be used by the search service 110 to limit the search to those voice communications that are associated with the specific user. If the search criteria comprise other search limiting information (e.g. dates, times etc.) this may also be used to limit the search.

At step 506, the search service 110 assigns each search result (each voice communication located by the search in step 504) a match score based on a comparison of the voice communication and the search criteria (e.g. how well the voice communication matches the search criteria). Any known method for generating a match score for search results may be used by the search service 110. For example, the match score may be based on how many times the keywords are found in the corresponding audio content data set.

At step 508, the search service 110 generates a weighted sum of the match scores for each voice communication located by the search. The weighting may be based on the particular audio content data set that was used to identify the voice communication.

For example, where the speech analysis service 106 of FIG. 2 is used, a particular voice communication could be identified three times during the search—once by the text-to-speech audio content data set, once by the phoneme lattice audio content data set, and once by the keyword identification audio content data set. The voice communication would then be assigned three match scores—one for the text-to-speech audio content data set, one for the phoneme lattice audio content data set and one for the keyword identification data set.

A weighted sum of the match scores is then generated for the voice communication. The weight assigned to a particular match score may be based on the accuracy of the corresponding audio content data set. For example, a phoneme lattice match score may be given a higher weighting than a text-to-speech match score on the basis that the phoneme-lattice technique typically produces more accurate results than the text-to-speech technique.

At step 510, the search service 110 ranks or sorts the search results (the voice communications located by the search in step 504) based on the weighted sums generated in step 508. For example, the search service 110 may sort the search results (the voice communications located by the search in step 504) in ascending or descending order based on the weighted sums.

The sorted or ranked search results may then be provided to the end-user device 102 where they are output to the user. For example, the end-user device 102 may display the search results in a search user interface, such as search user interface 302.

Figure 6:
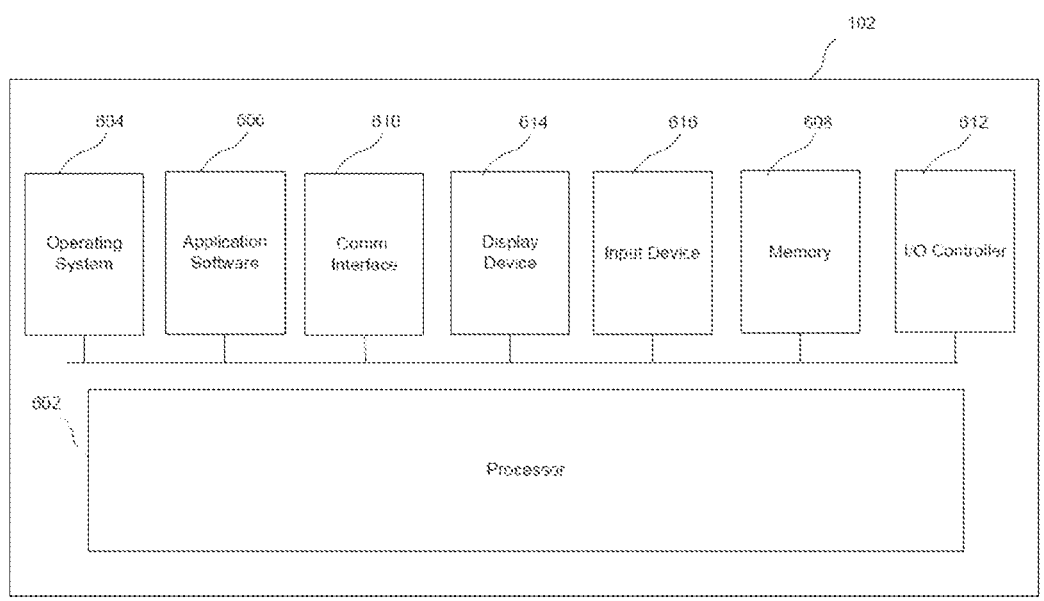
FIG. 6 is a block diagram of an exemplary end-user device of FIG. 1.

Reference is now made to FIG. 6 which illustrates an exemplary end-user device 102 which may be implemented as any form of a computing and/or electronic device, and in which embodiments of the foregoing description may be implemented.

End-user device 102 comprises one or more processors 602 which may be microprocessors, controllers or any other suitable type of processors for processing computer executable instructions to control the operation of the device in order to run applications, such as communication applications and actionable items analysis applications referred to herein. In some examples, for example where a system on a chip architecture is used, the processors 602 may include one or more fixed function blocks (also referred to as accelerators) which implement a part of the method of operation of the end-user device 102 or applications described herein in hardware (rather than software or firmware). Platform software comprising an operating system 604 or any other suitable platform software may be provided at the end-user device 102 to enable application software 606 to be executed on the device.

The computer executable instructions may be provided using any computer-readable media that is accessible by end-user device 102. Computer-readable media may include, for example, computer storage media such as memory 608 and communications media. Computer storage media, such as memory 608, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 608) is shown within the end-user device 102 it will be appreciated that the storage may be distributed or located remotely and accessed via a network or other communication link (e.g. using communication interface 610).

The end-user device 102 also comprises an input/output controller 612 arranged to output display information to a display device 614 which may be separate from or integral to the end-user device 102. The display information may provide a graphical user interface. The input/output controller 612 is also arranged to receive and process input from one or more devices, such as a user input device 616 (e.g. a mouse or a keyboard). This user input may be used to the communications and actionable items applications. In an embodiment the display device 614 may also act as the user input device 616 if it is a touch sensitive display device. The end-user device 102 may also be provided with other functionality as is known for such devices. For example, the communication interface 610 may comprise a radio interface to a mobile telephone or other wireless communications system, and microphone, speaker, and camera may be provided for voice and video calling.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A system to perform textual queries on voice communications, the system comprising:
    an index service for storing a plurality of audio content data sets for a plurality of voice communications, the plurality of audio content data sets comprising a speech-to-text audio content data set generated using a speech-to-text conversion technique, a phoneme audio content data set generated using a phoneme lattice technique, and a keyword audio content data set generated using a keyword identification technique; and
    a search engine configured to:
        receive search criteria from a user, the search criteria comprising at least one keyword;
        search each of the speech-to-text, phoneme and keyword audio content data sets for at least a portion of the plurality of voice communications to identify voice communications matching the search criteria; and
        combine the voice communications identified by each search to produce a combined list of identified voice communications,
    wherein combining the voice communications identified by each search comprises:
        assigning each identified voice communication a match score based on a comparison of the voice communication and the search criteria; and
        generating for each identified voice communication a weighted sum of the match scores for the voice communication, the weight of each match score being based on the particular audio content data set that identified the voice communication.

2. The system according to claim 1, wherein the weight of each match score is updated utilizing feedback from previous searches, said feedback being based on said user actions, by collecting an explicit signal or implicit ones, or by observing, which of the multiple matches, the user chooses to act on.

3. The system according to claim 1, wherein the search engine is further configured to rank the combined list of identified voice communications based on the weighted sums.

4. The system according to claim 1, further comprising:
    a first speech analysis engine configured to receive data representing the speech of a voice communication and analyze the data using the speech-to-text technique to generate the speech-to-text audio content data set for that voice communication;
    a second speech analysis engine configured to receive the data and analyze the data using the phoneme-lattice technique to generate the phoneme audio content data set for that voice communication; and
    a third speech analysis engine configured to receive the data and analyze the data using the keyword identification technique to generate the keyword audio content data set for that voice communication.

5. The system according to claim 1, wherein the index service is further configured to index the audio content data sets to generate indexed audio content data sets; and searching the audio content data sets comprises searching the indexed audio content data sets.

6. The system according to claim 1, further comprising an end-user device configured to receive the search criteria from the user, transmit the search criteria from the end-user device to the search service, receive the combined list of identified voice communications from the search service, and output the combined list of identified voice communications to the user.

7. The system according to claim 1, further comprising a database configured to store data for each voice communication of the plurality of voice communications, the data representing the speech of the voice communication.

8. The system according to claim 7, wherein the database is further configured to receive a request from a user for data for a particular identified voice communication and to provide the data to the user.

9. The system according to claim 1, wherein the keyword identification technique identifies relevant keywords in the voice communication and transcribes the identified keywords into text.

10. A computer-implemented method to perform textual queries on voice communications, the method comprising:
    storing a plurality of audio content data sets using an index service for a plurality of voice communications, the plurality of audio content data sets comprising a speech-to-text audio content data set generated using a speech-to-text conversion technique, a phoneme audio content data set generated using a phoneme lattice technique, and a keyword audio content data set generated using a keyword identification technique; and
    receiving at a search service search criteria from a user, the search criteria comprising at least one keyword;
    searching using the search service each of the speech-to-text, phoneme and keyword audio content data sets for at least a portion of voice communications to identify voice communications matching the search criteria; and combining the voice communications identified by each search to produce a combined list of identified voice communications, wherein combining the voice communications identified by each search comprises:

assigning each identified voice communication a match score based on a comparison of the voice communication and the search criteria; and generating for each identified voice communication a weighted sum of the match scores for the voice communication, the weight of a each match score being based on the particular audio content data set from which the voice communication was identified.

11. The method according to claim 10, further comprising ranking using the search engine the combined list of identified voice communications based on the weighted sums.

12. The method according to claim 10, further comprising receiving at a first speech analysis engine data representing the speech of a voice communication and analyzing the data using the speech-to-text technique to generate the speech-to-text audio content data set for that voice communication;

receiving at a second speech analysis engine the data and analyzing the data using the phoneme lattice technique to generate the phoneme audio content data set for that voice communication; and receiving at a third speech analysis engine the data and analyzing the data using the keyword identification technique to generate the keyword audio content data set for that voice communication.

13. The method according to claim 10, further comprising:

transmitting the combined list of identified voice communications to an end-user device; and outputting to the user using the end-user device the combined list of identified voice communications.

14. The method according to claim 13, further comprising:

receiving at the end-user device input from a user selecting one of the identified voice communications;

transmitting a request from the end-user device to a storage device requesting data representing the speech of the selected voice communication; and receiving at the end-user device the data.

15. The method according to claim 13, wherein the keyword identification technique identifies relevant keywords in the voice communication and transcribes the identified keywords into text.

16. A system comprising:

an index service that, for each of a plurality of voice communications, stores a plurality of audio content data sets including a speech-to-text audio content data set generated using a speech-to-text conversion technique, a phoneme audio content data set generated using a phoneme lattice technique, and a keyword audio content data set generated using a keyword identification technique; and a search engine configured to:

receive search criteria from a user, the search criteria comprising at least one keyword;

search, for each of at least a portion of the plurality of voice communications, each of the speech-to-text, phoneme and keyword audio content data sets for the voice communication to identify voice communications matching the search criteria; and combine voice communications identified by each search to produce a combined list of identified voice communications.

* * * * *